April 25, 1967   J. E. BASS   3,315,631
ELECTRIC OUTBOARD MOTOR
Original Filed Oct. 2, 1963   3 Sheets-Sheet 1
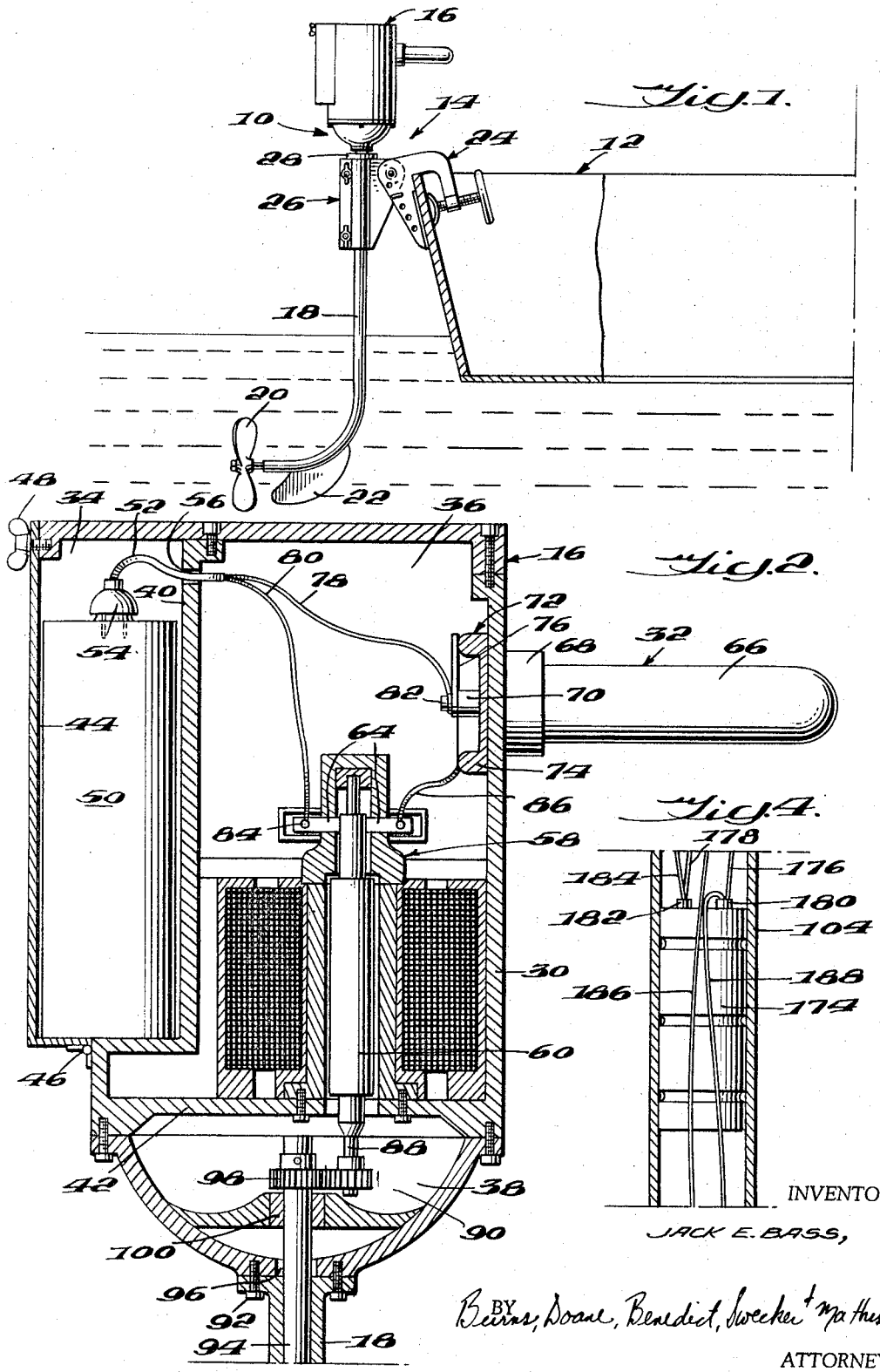
INVENTOR
JACK E. BASS,
BY Burns, Doane, Benedict, Swecker & Mathis
ATTORNEYS

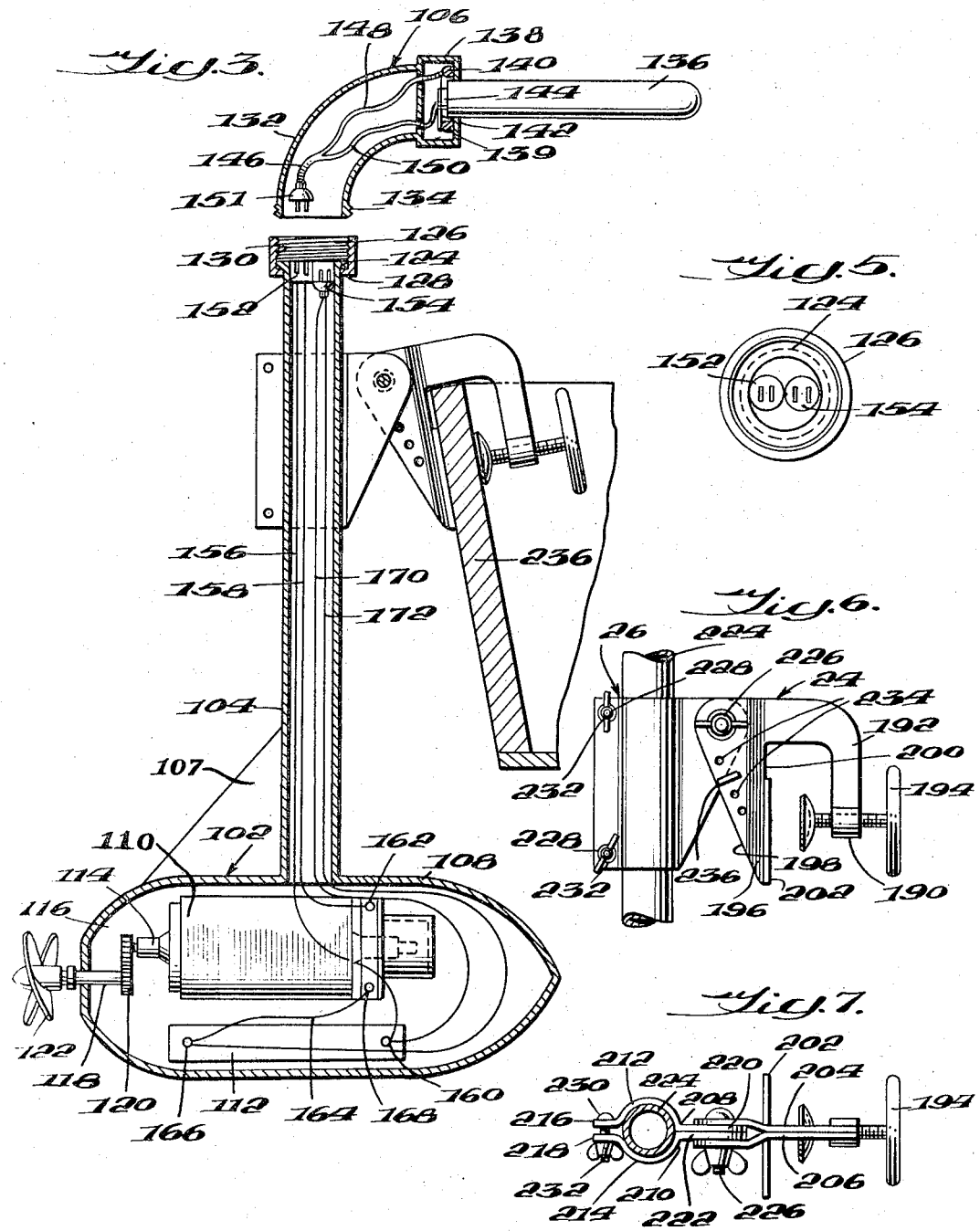

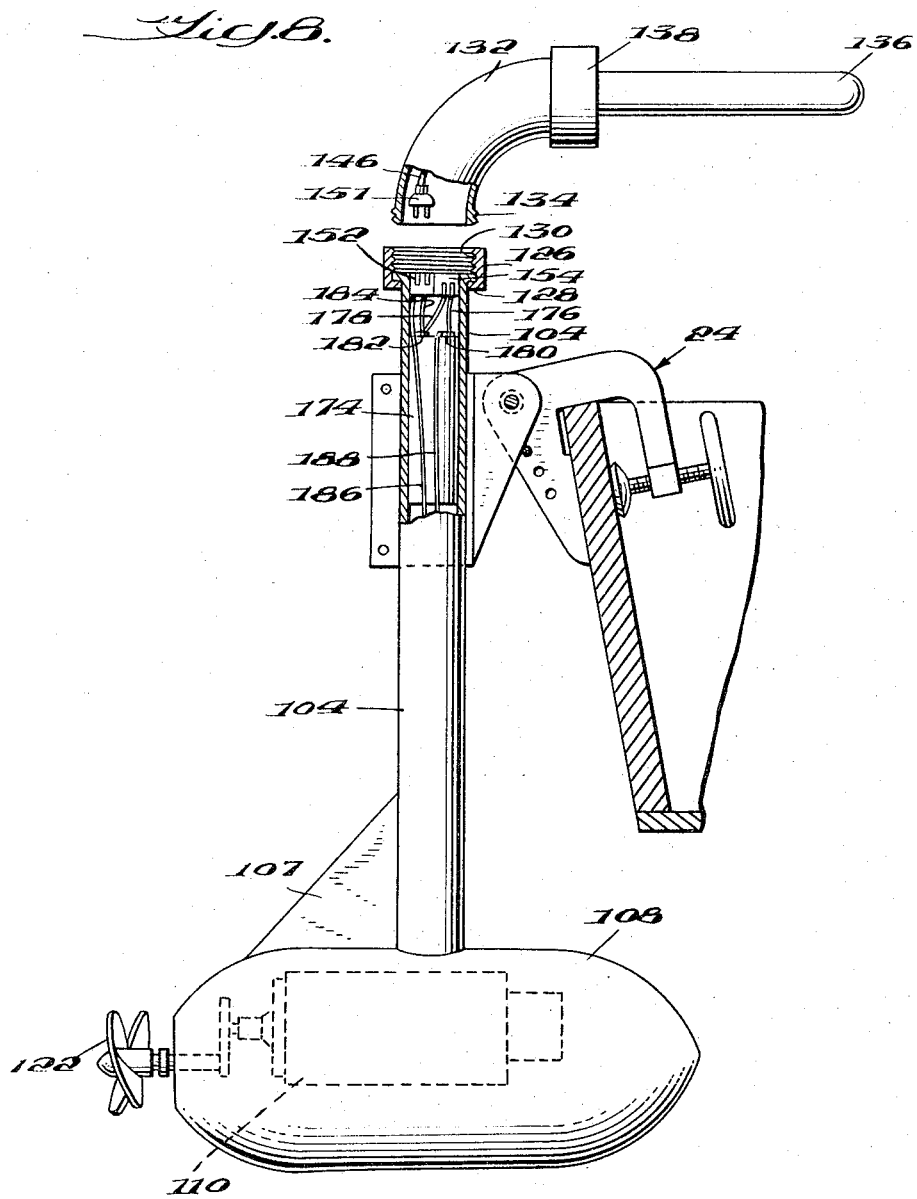

United States Patent Office 3,315,631
Patented Apr. 25, 1967

3,315,631
ELECTRIC OUTBOARD MOTOR
Jack E. Bass, 706 Berkshire St., Clinton, Miss. 39056
Continuation of abandoned application Ser. No. 313,309,
Oct. 2, 1963. This application Nov. 18, 1965, Ser. No. 516,822
4 Claims. (Cl. 115—18)

This invention relates to outboard motors, and more particularly to electric outboard or trolling motors suitable for use with small fishing boats. This application is a continuing application based on applicant's copending application Serial No. 313,309, filed Oct. 2, 1963 entitled "Outboard Motor," now abandoned.

In recent years electric outboard or trolling motors have become quite popular with some fishermen. Such motors usually comprise a small electric motor of about ¼ to ½ horsepower for driving a small propeller, the motor being electrically connected by leads to a remote 6 or 12 volt automobile type lead acid battery. Such electric trolling motors are often used as an alternate power source on fishing boats of about 12 to 14 feet in length on which a high horsepower, gasoline type, outboard motor is installed to provide high speed locomotion. So installed, the electric trolling motors are used to drive the fishing boat at trolling speed of about 1 to 3 miles per hour and are a favored trolling power source because of their extremely quiet operation.

Although the electric trolling motors heretofore commercially available have enjoyed substantial acceptance, they have not been entirely satisfactory in several respects. In spite of the fact that a motor of this type is usually mounted by brackets on a boat for 360° rotation of steering direction to permit traveling in a reverse direction by rotating the motor 180°, full rotation of the motor, as when returning to forward travel, is not practical because the motor is electrically connected by long leads to an automobile type battery that is positioned at a remote location in the boat. After a 360° turn of the motor, the electric leads wrap around the motor and either prohibit further rotation of the motor in the same direction or the leads are pulled loose from their connection to the battery.

Further an electric trolling motor of this type is usually mounted by brackets on a boat so that the motor may be slipped directly upward within the brackets to an inoperative position out of the water, as when the boat is being propelled by a high horsepower gasoline outboard motor. To facilitate such vertical movement of the trolling motor, the electric leads connecting the motor to a remote battery must be quite long and slack. Because of this, when the trolling motor is in the lowered or operational position, the slack leads sometimes flap around and foul fishing lines and lures and are generally a safety hazard to fishermen moving about within the boat.

Still further, because the trolling motors heretofore available require connection by electric leads to a remotely positioned battery, this requirement sometimes limits positioning of the motor on the boat. For example, such trolling motors are sometimes mounted in the bow of a boat. So positioned, the trolling motor does not interfere with turning the rear mounted gasoline outboard motor and provides direct steering action in a forward direction. However, such forward positioning is only possible if a convenient forward location for the battery is available adjacent the motor, which may or may not be the case.

Still further, at whatever location in the boat the automobile-type battery is positioned, it may be subjected to water spray when the boat is traveling at high speeds. The spray, when mixed with battery acid on the exposed surface of the battery, is sometimes injurious to the fisherman and his gear. Also the presence of water in the boat about the exposed battery raises the danger of electric shocks.

In recognition of a need for an improved electric outboard motor, it is a general object of the present invention to provide an electric outboard motor that minimizes or circumvents the problems heretofore noted.

More specifically, it is an object of this invention to provide a self-contained electric outboard motor which may be rotated a full 360° about a vertical axis for steering purposes.

It is another object of this invention to provide an electric outboard motor that may be conveniently mounted at any point about a boat gunwale.

A further object of the present invention is to provide a battery powered electric outboard motor wherein exposed electrical leads are eliminated.

Another object of this invention is to provide a battery powered electric outboard motor wherein the battery is concealed and protected.

In achieving these and other objects as will become apparent hereinafter, the present invention provides an electric outboard motor wherein the battery is mounted within a sealed housing fixed on the motor per se. In this manner, the battery may be protected and the long exposed electric leads heretofore required to connect such a motor to a remote battery are eliminated, 360° steering rotation and vertical adjustment are facilitated, the battery protected, and the motor advantageously balanced.

Additional advantages and the versatility of the electric trolling motor according to this invention will become apparent from the following detailed description of the invention as shown in the accompanying drawings forming a part thereof, in which:

FIGURE 1 is a side elevation view of one embodiment of an electric trolling motor according to the present invention shown mounted on the rear of a boat, a part of which is shown in cross section;

FIGURE 2 is an enlarged cross-sectional view of the upper portion of the motor shown in FIGURE 1.

FIGURE 3 is a cross-sectional view of a modified form of an electric trolling motor according to the present invention;

FIGURE 4 is a partial cross-sectional view of a tubular column of still another embodiment of an electric trolling motor according to the present invention;

FIGURE 5 is a top plan view of the tubular column of the motor shown in FIGURE 3;

FIGURE 6 is an elevation view of a motor bracket assembly;

FIGURE 7 is a top plan view of the bracket assembly shown in FIGURE 6; and

FIGURE 8 is a side elevation view, partly in section, of an electric trolling motor according to the present invention showing the embodiment of FIGURE 4.

Referring to FIGURE 1 of the drawings, one embodiment of an electric outboard or trolling motor 10 according to this invention is shown, the motor being mounted on the rear of a small boat 12 by means of a bracket assembly 14. Although shown in the rear of a boat, it should be noted that the motor may be mounted at any convenient location about the boat gunwale. The trolling motor 10 includes a sealed or watertight housing unit 16 adjacent the upper end of the motor, a tubular drive shaft casing 18, a marine propeller 20 adjacent the lower end of the motor, and a rudder 22 attached to the drive shaft casing 18.

The bracket assembly 14 is of a conventional type and comprises a boat clamping member 24 and a motor clamping member 26. Interposed between the motor clamping member 26 and the housing unit 16 is a washer 28 preferably made of an antifriction material such as nylon or the like. As will be discussed more fully hereinafter, the entire outboard motor 10 is free to pivot 360° or more about a vertical axis in relation to its clamping member 26 to enable an operator to maneuver the boat in a forward or reverse direction. The washer 28 prevents the housing from rubbing against the clamping member during pivoting.

As shown in FIGURE 2, the watertight housing unit 16 comprises a main casing 30 and a steering assembly 32. The casing divides the body of the housing unit 16 into three main compartments: the power supply compartment 34, the motor mounting compartment 36, and the gear train compartment 38. The first two compartments are separated from each other by a partition 40 while the latter two are separated by a partition 42. Access to the power supply compartment 34 can be had by displacement of a panel 44 which is pivotable about a hinge 46 mounted on the main casing 30. The panel is held in its closed position by a winged screw 48 or the like.

In accordance with the present invention, a rechargeable battery 50, generally of the Edison cell design but preferably of the nickel-cadmium type, is mounted within and protected by the power supply compartment 34. An electrical conducting wire 52 is releasably connected to the rechargeable battery by a suitable connector, such as by a male connector member 54. The electrical conducting wire passes through an opening 56 in partition 40 into the motor mounting compartment 36. Since the male connector 54 is releasable, it is possible for the battery to be recharged by opening the power supply compartment 34, detaching the connector 54, and attaching another conducting device from an appropriate external power source. Additionally, the releasable connection 54, along with the pivotable panel 44, permits the battery to be replaced by an auxiliary battery with little effort even when away from shore.

The steering assembly 32, which is mounted on the casing 30, comprises a handle 66 which is rotatably mounted in a mounting member 68. This mounting member 68 is fixedly attached to the casing of the housing assembly by any suitable means, such as welding. An extension 70 of the rotatable handle passes through the casing 30 into the upper portion of the motor mounting compartment 36 as shown in FIGURE 2.

A rheostat 72 is provided to vary the resistance and is in series with the magnetic motor 58 of any suitable type to permit varying the motor speed. As shown in FIGURE 2 the rheostat comprises a circular resistance coil 74 mounted on the inside wall of the main casing 30 and surrounding the handle extension 70. A brush member 76 is mounted on the handle extension 70 and is in sliding contact with the resistance coil 74.

The conducting wire 52 which is connected to the rechargeable battery 50 comprises two conductors 78 and 80. One of these conductors 78 is connected to the brush member 76 of the rheostat as shown at 82 while the other conductor 80 is connected to the brushes of the motor as shown at 84.

The electrical circuit is completed by connecting the resistance coil 74 and the brushes 58 of the motor by a conductor 86. Accordingly, the electric motor is connected in series with a rheostat 72 and a power source comprising a rechargeable battery 50. The rheostat 72 is operated by rotating the handle member 66 whereupon the brush 76 makes contact at different points about the resistance coil 74 thereby changing the resistance. Since a circular rheostat is provided, an indefinite range of speeds is possible. Additionally, with this arrangement the operator can regulate the speed of the motor with the same hand that is used to steer the boat, leaving the other hand free for another purpose.

While it is contemplated that the resistance coil 74 will have a non-conductive region which will provide an off position for the handle members, it may be convenient to also provide another switch in the circuit to provide an on and off control.

The rotor 60 of the magnetic motor 58 has an extended portion forming a driving shaft 88. The driving shaft projects through the partition 42 into the gear train compartment 38 and has a small gear 90 mounted on its free end. The tubular drive shaft casing 18 is attached by suitable means such as crews 92 to the main casing 30 of the housing unit 16 which surrounds the gear train compartment 38.

Attached to the upper end of a flexible drive shaft 94 which projects through an opening 96 provided in the casing 30 is a relatively large pinion 98 which engages the small gear 90 to establish a speed reduction driving connection from the motor 58 to the propeller 20. Suitable bearings or bushings 100 are provided to support the upper end of the drive shaft in proper position with respect to the housing. By virtue of the particular gearing arrangement, the flexible drive shaft 94 will rotate at a speed less than that at which the motor 58 is turning the rotor 60.

The modification in FIGURE 3 depicts a trolling motor wherein the motor housing is entirely watertight and is adapted to be submerged in the water. The trolling motor comprises a housing 102, a tubular column 104 and a steering assembly 106. A rudder 107 may be fixed to the housing 102 and the column 104. The housing unit 102 includes a torpedo-shaped casing 108 in which mounted a motor 110 and a rechargeable battery 112. Attached to an extension 114 of the rotor of the motor is small gear 116. A drive shaft 118 is suitably mounted in bearings on the casing and has a relatively large pinion 120 attached near one end which connects with the gear 116. A propeller 122 is mounted on the opposite end of the drive shaft 118. As in the previous modification, the propeller will be rotating at a lower speed than the motor turns the rotor.

The tubular column 104 is attached to the torpedo casing 108 of the motor housing 102 and extends upwardly therefrom a distance such that when the outboard motor is mounted, the housing unit 102 will be submerged in the water below the bottom of the boat. The tubular column terminates at its upper portion in a flange portion 124. A pipe coupling member 126 is provided which has a flange 128 engaging the flange 124 of the tubular extension member thereby prohibiting withdrawal of the pipe coupling member. The internal surface of the pipe coupling member is threaded as shown in 130.

The steering assembly 106 has a curved tubular portion 132. One end of this tubular portion is externally threaded as at 134 for engagement with the internal threads 130 of the pipe coupling member 126. A handle 136 is rotatably mounted in a rheostat housing member 138. As shown in FIGURE 3, a rheostat 139 includes a circular resistance coil 140 mounted on the internal wall of the rheostat housing member. A brush member 142 is attached to a reduced portion 144 of the handle. This brush member 142 is in contact with a resistance coil 140.

An electrical conducting wire 146 comprising two conductors 148 and 150 is provided in the steering assembly with one conductor 148 having one end attached to the resistance coil 140 and the other conductor 150 having one end attached to the brush member 142. The conducting wire 146 terminates in a male connector member 151, or the like. Mounted at the upper end of the tubular column 104 are two suitable electrical connectors 152 and 154. The connector 152 is a female connector adapted to receive the male connector 151, while the connector 154 is a male connector provided for a purpose to be explained later.

Two conductors 156 and 158 are electrically connected to the female connector 152. The conductors pass through the tubular column 104 into the casing of the housing 102 whereupon the conductor 156 is connected to one of the terminals 160 of the rechargeable battery 112 while the other conductor 158 is connected to one of the terminals 162 of the motor 110. An additional conductor 164 connects the other terminal 166 of the battery with the other motor terminal 168.

The electrical conducting wire 146 in the steering assembly should be slightly coiled so that the male connector 151 can be plugged into the female connector 152 before the steering assembly 106 is secured to the tubular column 104. After the connection is made between connectors 151 and 152, an electrical circuit is formed between the rechargeable battery 112 and the motor 110 which includes a rehostat 139 in series. As in the prior embodiment, the speed of the motor can be controlled by rotating the handle 136 about its longitudinal axis to move the brush member 142 to a different position about the resistance coil 140.

Two additional conductors 170 and 172 are attached to the battery terminals 160 and 166 respectively. These conductors pass up through the tubular column 104 and are connected to the male connector 154. The male connector provides a means whereby the battery can be electrically connected to an external power source for recharging the battery when the steering assembly 106 is removed. Since the connector is positioned adjacent the upper end of the tubular column, there is no need for the battery to be taken out of its housing for recharging. With the provision of a releasable connection between the steering assembly and the tubular column, it is possible to disconnect the steering assembly and attach in its place a conventional foot operated steering control system.

Instead of mounting the battery within the submerged housing unit, an alternate embodiment of the present invention includes mounting the battery in the tubular column immediately below the connectors 152 and 154. The battery may be retained in position either by a friction fit or by providing bracket means within the tubular column.

FIGURES 4 and 8 show this embodiment wherein a cylindrical rechargeable battery 174 which may have a diameter of about 1¼ inches and be of a length of about 12 inches is positioned within the watertight tubular column 104. Conductors 176 and 178, attached to battery terminals 180 and 182 respectively, are connected to the male connector 154 to provide a battery recharging circuit. The power supply circuit including the motor and rheostat includes conductors 184, 186 and 188. Conductor 184 extends from the terminal 182 of the rechargeable battery 174 to the female connector 152 while the conductor 186 extends from a terminal of the motor to the female connector. The conductor 188 extends from the battery terminal 180 to the other terminal of the motor. Of course, if it is desired to utilize a battery of a shape other than cylindrical, as for example a cubic shape, an appropriate size and shape housing may be provided at this location on the tubular column 104.

As is well known, rechargeable batteries are relatively small and light in weight. Thus, when such batteries are mounted within the housings of the various embodiments of the present invention, the resulting trolling motors will be compact and light enough to be conveniently carried by hand.

A conventional bracket construction that may be used with the trolling motors of the present invention is shown in FIGURES 6 and 7. The bracket assembly should be such to permit tilting the rolling motor out of the water about a horizontal axis and raising the motor out of the water in a directly vertical direction. The bracket assembly comprises an inverted U-shaped boat clamping member 24 of any suitable type having an internally threaded bore 190 near the extremity of one of its legs 192 for the reception of threaded screw means 194. The other leg 196 of the U has its outside edge 198 tapering inwardly while the inside edge 200 remain parallel to the axis of the leg. A flat plate 202 is attached to the edge 200 of leg 196.

For ease of manufacture, the boat clamping member may be stamped from a single piece of metal and bent about the axis of the bore 190 to form two similarly shaped adjacent members 204 and 206. The members may be welded or otherwise held together along the base of the inverted U. However, the two members that form leg 196 should be spaced apart as shown in FIGURE 7 for the pivotal reception of the motor clamping member 26.

The outboard motor clamp 26 comprises two members 208 and 210. Each of these members includes an elongated concave portion 212 and 214, a flange portion 216 and 218 connected to one edge of the concave portion 212 and 214 and a tapered flat portion 220 and 222 connected to the other edge of the concave portion 212 and 214.

The members 208 and 210 are placed about the tubular column or drive shaft casing 224 of the trolling motor with the concave portions 212 and 214 engaging the column or casing. The tapered flat portions 220 and 222 are located between the two spaced apart members of leg 196 of the boat clamping member 24 and are secured by a nut and screw assembly 226 which passes through aligned apertures in each of the members.

Flanges 216 and 218 are provided with two apertures 228 for reception of bolts 230 having a winged nut 232 on their ends. By tightening or loosening the nuts 232, the fit between the tubular column or drive shaft casing 224 and the clamp 26 may be varied to the point where the outboard motor can be rotated about the axis of the clamping member with ease, yet with enough friction to hold it in a given position. This enables the operator to set the boat on its desired course without having to constantly maneuver the outboard motor. Also, the column may be slipped vertically within the clamp 26 to raise the motor to an inoperative position out of the water and be retained in this position by tightening the nuts 232.

The leg 196 of the boat clamping member 24 has a plurality of holes 234 spaced in close proximity to its outer tapered edge 198. As shown in FIGURES 6, if a line were drawn through the axes of these holes, it would be substantially parallel to the tapered edge 198. Accordingly, the angular relationship betweeen the two clamps may be adjusted by pivoting one clamp in relation to the other about the screw assembly 226. When the desired angular relationship is achieved, a pin 236 is inserted through a hole 234 in the leg 196 and the edge surface of the tapered flat portions 220 and 222 will abut the pin thereby holding the two clamping members in their desired position. The transom 236 of the boat is to be clamped between the screw means 194 and the flat plate 202 of the clamping member. With this arrangement, the axis of the tubular portion of the outboard motor will always be substantially vertical regardless of the angle of the transom of the boat on which it is mounted. However, the motor will be free to tilt in an upward or counterclockwise direction, as shown in FIGURE 1, upon striking a submerged obstacle or the like.

It will be seen that in each of the embodiments herein disclosed, a self-contained fully watertight electric trolling motor is provided. Because the battery is positioned within the trolling motor, the long, slack electric leads required by the prior art devices to connect a trolling motor to a remote battery are eliminated. In this way, 360° steeing rotation of the motor is practical. Lead wire wrapping is eliminated. Vertical movement of the motor to an inoperative position is facilitated without necessitating slack leads. The self-contained motor of the present invention may be positioned at any convenient location about the boat gunwale, such positioning not being restricted by leads to the battery. Further, because the battery is positioned in a sealed housing, water spray will not create a shock hazard or the likelihood of damage to the fisherman's gear by water spray acting as a vehicle for battery acid. Elimination of the heavy automobile type battery in favor of the light dry cell type minimizes transportation problems, particularly in view of the feature of the present invention wherein the battery is received within and protected by the trolling motor housing. Further, positioning of the battery on the upper end of the trolling motor aids in counterbalancing the electric motor on the lower end whereby the trolling motor may be more easily tilted in an upward direction as when the lower end strikes a submerged obstacle. In this way, the likelihood of damage to the propeller is reduced.

Various other modifications and alterations will readily occur to those skilled in the art. It is intended, therefore, that the foregoing be considered as exemplary only and that the scope of this invention be ascertained from the following claims.

What is claimed is:

1. An electric outboard motor having upper and lower ends, tubular column means interposed between said upper and lower ends, motor bracket means pivotally receiving said tubular column means for 360° rotation about a vertical axis, adjustable means vertically adjustably fixing said tubular column means within said motor bracket means, boat bracket means adapted to be connected to a boat, connecting means pivotally connecting said motor bracket means to said boat bracket means for pivotal movement about a horizontal axis, steering assembly means including handle means projecting from said upper end of said outboard motor, sealed housing means adjacent said lower end of said outboard motor, battery powered motor means positioned within said housing means, marine propeller means adjacent said lower end of said outboard motor, reduction gear and shaft means drivingly connecting said motor means to said propeller means, rechargeable battery means positioned in said housing means, first conductor means positioned within said housing means electrically connecting said battery means and said motor means, second conductor means extending from said battery means to a location adjacent said upper end of said outboard motor and terminating in electrical connector means positioned in said tubular column means for recharging said battery means from an external power source, said steering assembly means being releasably connected to said column means adjacent said electrical connector means to permit access to said electrical connector means, and adjustable resistance means adjacent said upper end of said outboard motor and interposed between said battery means and said motor means in said first conductor means for varying the speed of said motor means, said steering handle means being rotatably mounted about a longitudinal axis and being operatively connected to said adjustable resistance means for adjusting the resistance thereof by rotation of said handle means, whereby a self-contained electric outboard motor is provided wherein said battery means and said first and second conductor means are sealed therein.

2. An electric outboard motor having upper and lower ends, tubular column means interposed between said upper and lower ends, motor bracket means pivotally receiving said tubular column means for 360° rotation about a vertical axis, adjustable means vertically adjustably fixing said tubular column means within said motor bracket means, boat bracket means adapted to be connected to a boat, connecting means pivotally connecting said motor bracket means to said boat bracket means for pivotal movement about a horizontal axis, steering handle means projecting from said upper end of said outboard motor, sealed housing means adjacent said upper end of said outboard motor, battery powered motor means positioned within said housing means, marine propeller means adjacent said lower end of said outboard motor, reduction gear and shaft means drivingly connecting said motor means to said propeller means, rechargeable battery means positioned in said housing means, said battery means including electrical connector means for recharging said battery means from an external power source, said housing means including access means to said battery means, conductor means positioned within said housing means electrically connecting said battery means and said motor means, and adjustable resistance means adjacent said upper end of said outboard motor and interposed between said battery means and said motor means in said conductor means for varying the speed of said motor means, said steering handle means being rotatably mounted about a longitudinal axis to said housing means and being operatively connected to said adjustable resistance means for adjusting the resistance thereof by rotation of said handle means, whereby a self-contained electric outboard motor is provided wherein said battery means and said conductor means are sealed therein.

3. An electric outboard motor having upper and lower ends, tubular column means interposed between said upper and lower ends, motor bracket means pivotally receiving said tubular column means for 360° rotation about a vertical axis, adjustable means vertically adjustably fixing said tubular column means within said motor bracket means, boat bracket means adapted to be connected to a boat, connecting means pivotally connecting said motor bracket means to said boat bracket means for pivotal movement about a horizontal axis, steering handle means projecting from said upper end of said outboard motor, first sealed housing means adjacent said upper end of said outboard motor, second sealed housing means mounted adjacent said lower end of said outboard motor, battery powered motor means mounted within said second housing means, marine propeller means adjacent said lower end of said outboard motor, reduction gear and shaft means mounted within said second housing means drivingly connecting said motor means to said propeller means, rechargeable battery means positioned in said first housing means, said battery means including electrical connector means for recharging said battery means from an external power source, said first housing means including access means to said battery means, conductor means electrically connecting said battery means and said motor means, and adjustable resistance means adjacent said upper end of said outboard motor and interposed between said battery means and said motor means in said conductor means for varying the speed of said motor means, said steering handle means being rotatably mounted about a longitudinal axis and being operatively connected to said adjustable resistance means for adjusting the resistance thereof by rotation of said handle means, whereby a self-contained electric outboard motor is provided wherein said battery means and said conductor means are sealed therein.

4. An electric outboard motor according to claim 3 wherein said housing means receiving said battery means is cylindrical and forms a smooth extension of like diameter relative to said tubular column means.

References Cited by the Examiner

UNITED STATES PATENTS

| 2,116,146 | 5/1938 | Gondek | 115—18 |
| 2,429,774 | 10/1947 | Schultz et al. | 115—18 |
| 2,814,906 | 12/1957 | Orvis | 115—18 |

FOREIGN PATENTS 305,465  2/1933  Italy.

MILTON BUCHLER, *Primary Examiner.*

ANDREW H. FARRELL, *Examiner.*